United States Patent Office 2,802,794
Patented Aug. 13, 1957

2,802,794

PREPARATION OF PLATINUM METAL CATALYSTS

Jerome W. Sprauer, Niagara Falls, N. Y., assignor to E. I. du Pont de Nemours and Company, Wilmington, Del., a corporation of Delaware No Drawing. Application December 21, 1953, Serial No. 399,643

14 Claims. (Cl. 252—466)

This invention relates to the preparation of catalysts comprising a metal of the platinum metal group supported on activated alumina, hereinafter referred to as platinum metal-on-alumina catalysts.

Catalysts of the above type are known for use in catalyzing various hydrogenation and dehydrogenation reactions. They are usually prepared by impregnating an activated alumina support material with a solution of a compound of a metal of the platinum metal group and reducing the impregnated compound to the metal.

It is an object of the invention to provide an improved method for preparing catalysts of the above type. A particular object is to provide a method for preparing such catalysts having increased catalytic acitivity. Another object is a method for preparing such catalysts involving the use of preconditioned activated alumina whereby catalysts of improved activity are obtained. Still further objects will be apparent from the following description.

The above objects are accomplished in accordance with the invention by preliminarily subjecting the activated alumina which is to be used as the support for the metal in preparing the platinum metal-on-alumina catalyst, with an aqueous solution of a strong inorganic oxidizing agent, following which the pretreated alumina is impregnated with a solution of a compound of a metal of the platinum metal group and the impregnated compound is reduced to the metal. The terms "metal of the platinum metal group" and "platinum metal" (as distinguished from metallic platinum) are used to designate any metal of the platinum metal group, i. e., ruthenium, rhodium, palladium, osmium, iridium and platinum; and alloys or mixtures of two or more of such metals.

The preliminary treatment of the activated alumina support material can be effected using any strong inorganic oxidizing agent which does not lead to excessive dissolution of the alumina or to precipitation thereon of compounds which cannot be readily removed from the alumina, e. g., because of their insolubility. Illustrative of suitable oxidizing agents are the water-soluble (e. g. the alkali metal) permanganates, pervanadates, permolybdates, monopersulfates and perphosphates. Also suitable are hydrogen peroxide, ozone, the alkali metal peroxides, such as sodium peroxide, and the perhydrates such as sodium perborate and sodium percarbonate. Other suitable oxidants are the active halogen compounds such as the alkali metal and alkaline earth metal hypochlorites and hypobromites, hypochlorous acid, chlorine, bromine, chlorine dioxide and the alkali metal chlorites.

Of the above oxidizing agents, the alkali metal hypochlorites are especially effective and constitute a preferred class, of which sodium hypochlorite is especially preferred because of its relative cheapness, general availability and high effectiveness.

The pretreatment of the alumina is effected using an aqueous solution of the oxidizing agent, hence, the agent should be appreciably soluble in the aqueous treating medium. A solubility of at least about 0.1% is generally desirable and solution concentrations of 0.5 to 4% are preferred. Higher concentrations, e. g. up to 10% or more, can be used when solubilities permit but no added advantage ordinarily results therefrom.

Conditions such as temperature and duration of the pretreatment do not appear to be critical. Temperatures from the freezing point up to the boiling point of the treating medium are effective, those above about 50° C. being generally preferred. Treatment times ranging from a few minutes up to several hours are effective, times ranging from about 0.2 to 2 hours being generally preferred.

The solution of the oxidizing agent will advantageously have a pH in the range 4 to 10. More alkaline and more acidic solutions can be used but are preferably avoided because alumina attack tends to become appreciable under such conditions. The optimum pH for the treating solution may vary somewhat depending upon the particular oxidizing agent used. The preferred range for sodium hypochlorite is about pH 6 to 9. pH can be readily controlled by the use of suitable buffer agents, e. g. sodium bicarbonate in suitable concentrations alone or in combination with carbon dioxide.

The invention is applicable to the preparation of catalysts comprising any metal of the platinum metal group on any support material containing activated alumina in a predominating amount, i. e. at least 50% of the weight of the support. By "activated alumina" is meant any natural or synthetic hydrated alumina which has been dehydrated or partially dehydrated by heating in known manner, e. g. at 300 to 800° C., whereby a microporous alumina is obtained. The commercial activated aluminas usually contain a predominant amount of alpha-alumina monohydrate, gamma-alumina, or both. In contrast with the activated aluminas is the alumina known as corundum, which is not microporous and is unsuitable as the catalyst support in practicing the present invention. The activated alumina which is to serve as the support material may itself be supported upon some other base material such as kieselguhr. The alumina used will usually be granular and of particle sizes ranging from 10 microns in diameter to 2 mesh, the preferred size being in the range 80 to 200 mesh.

The invention is illustrated by the following examples. In the examples and throughout the specification, all percentages of reagents represent percentages by weight.

*Example 1*

A 25 g. portion of a commercial activated alumina graded to 80–200 mesh (Tyler standard sieve) was treated for about 1 hour at 70 to 80° C. with about 150 ml. of a water solution containing about 2.7 g. sodium hypochlorite and 5 g. sodium bicarbonate. It was then washed successively with water, with about 0.25% aqueous hydrogen peroxide and again with water, then resuspended in water. The slurry was saturated with carbon dioxide, the solution decanted, the alumina resuspended in 125 ml. of water and the slurry resaturated with carbon dioxide, the pH then being 6.2. While maintaining a carbon dioxide atmosphere, 10 ml. of an aqueous solution containing 0.25 g. of palladous chloride ($PdCl_2$) and 0.04 g. HCl was added in 2 minutes to the vigorously agitated slurry. The slurry was then heated in about 10 minutes to 75° C. and 0.3 ml. of 37% aqueous formaldehyde was added to reduce the palladium salt. Addition of 3 g. of sodium bicarbonate changed the pH from 7.0 to 8.1. After digesting 15 minutes at 70–80° C., 0.5 ml. of 35% aqueous hydrogen peroxide was added to destroy any catalyst poison which may have been introduced inadvertently. The palladium-on-alumina catalyst particles were filtered out, washed with water and dried in a shallow layer at 100 to 110° C. The dried catalyst contained 0.6% metallic palladium.

The activity of the above catalyst was tested by suspending 1 g. in 300 ml. of a reference solution of 2-t-butylanthraquinone dissolved in a mixture of methylnaphthalene and diisobutylcarbinol. Hydrogenation of the butylanthraquinone was effected by passing hydrogen into the mixture at a specific rate while maintaining the mixture at a suitable specific temperature. By periodically analyzing the solution, it was found that the rate of conversion to 2-t-butylanthrahydroquinone was 0.192 mole per liter of solution per hour.

*Example 2*

A suspension of 400 g. of the alumina described in Example 1 in 800 ml. of water was heated to about 75° C. and a solution of 4.0 g. palladous chloride in 160 ml. of water containing 0.7 g. HCl was added with stirring. While continuing stirring, 4 ml. of 37% aqueous formaldehyde was added. After several minutes with occasional stirring at 70 to 80° C., 500 ml. of a 5% sodium bicarbonate solution was added. After about 10 minutes at this temperature, 8 ml. of 35% aqueous hydrogen peroxide was added with stirring. The catalyst particles, after being separated, washed and dried as described in Example 1, contained 0.6% palladium.

The rate of hydrogenation obtained using the above catalyst under the test conditions employed for the catalyst of Example 1, was 0.115 mole per liter of solution per hour, or only 60% of the rate obtained with the catalyst of Example 1.

*Example 3*

A 25 g. portion of a lot of activated alumina similar to that used in the above examples but from a different shipment was treated for about 2 hours at 70 to 80° C. with 110 ml. of water containing about 3.5 g. $H_2O_2$ and 5 g. $NaHCO_3$. The alumina was washed 3 times with water by decantation, resuspended in water and the water saturated with carbon dioxide. The solution was decanted and water again added to give a slurry containing 125 g. water which upon being saturated with carbon dioxide had a pH of 6.3. Impregnation with palladium chloride and subsequent operations in preparing the catalyst were substantially as described in Example 1.

The above catalyst was found to have an activity, when tested by the procedure described in Example 1, of 0.148 mole per liter of solution per hour. In comparison, catalysts prepared from the same lot of alumina but following the procedures of Examples 1 and 2, respectively, showed test values of 0.158 and 0.069. The difference between this 0.158 value and the value reported for the catalyst of Example 1, and also the difference between the 0.069 value and that reported for the catalyst of Example 2, are attributed to inherent differences between the two lots of alumina used.

A catalyst from the same lot of alumina used in Example 3 was prepared as described in that example, except that the sodium bicarbonate solution used in the initial treatment contained no hydrogen peroxide. Under the test conditions described in Example 1, this catalyst gave a test value of 0.115 mole per liter per hour as compared with 0.148 for the catalyst of Example 3.

*Example 4*

A catalyst was prepared using a third lot of commercial activated alumina generally similar to that used in the above examples. 100 g. of the alumina was suspended in water and commercial sodium hypochlorite containing an excess of alkali was added and the suspension was saturated with carbon dioxide. The proportions chosen were such that the solution phase of the slurry was about 600 ml. and contained about 10 g. NaOCl and 5 g. $NaHCO_3$ with excess carbon dioxide. A substantial part of the NaOCl is hydrolyzed to hypochlorous acid under these conditions. The slurry was heated with stirring for 1 hour at 75–90° C. under a carbon dioxide atmosphere, at the end of which time the solution phase was at pH 7.4. The treated alumina was washed 3 times by decantation, resuspended in water, treated with 4 ml. of aqueous 35% hydrogen peroxide, decanted, and resuspended in water saturated with carbon dioxide, at which point the pH of the liquid phase was 6.5. The liquid phase was again decanted and the alumina resuspended in 500 ml. of water saturated with carbon dioxide. There was added to the slurry in about 2 minutes, 40 ml. of an aqueous solution containing 1.00 g. $PdCl_2$ and 0.16 g. HCl while stirring vigorously and maintaining a carbon dioxide atmosphere. The pH of the liquid phase at this point was 5.3. The suspension was heated to and maintained at 75° C. for 30 minutes at which time the pH was 6.4. 1 ml. of 37% aqueous formaldehyde was added and the suspension held at 75° C. with gentle stirring for 30 minutes, at which time the pH of the liquid phase was 6.2. 2 ml. of aqueous 35% hydrogen peroxide was added and the catalyst was filtered, washed and dried.

When tested by the method described in Example 1, the above catalyst gave a test value of 0.184 mole per liter per hour.

*Example 5*

A catalyst was prepared with a 25 g. portion of activated alumina similar to that described in Example 1 and using the procedure substantially as described in Example 1 with the exception that the 10 ml. of platinum metal impregnating solution contained 0.225 g. of palladium chloride ($PdCl_2$), 0.040 g. of chloroplatinic acid ($H_2PtCl_6 \cdot 6H_2O$), and 0.04 g. HCl. The final dried catalyst contained about 0.54% metallic palladium and about 0.06% metallic platinum.

The rate of hydrogenation obtained using the above catalyst under the test conditions employed for the catalyst of Example 1 was 0.184 mole per liter of solution per hour.

*Example 6*

A catalyst was prepared as described in Example 5 with the exception that the impregnating solution contained 0.039 g. ruthenium chloride ($RuCl_3 \cdot 3H_2O$) instead of the 0.040 g. of chloroplatinic acid. The final dried catalyst contained about 0.54% metallic palladium and about 0.6% metallic ruthenium.

When tested under the test conditions employed for the catalyst of Example 1, the rate of hydrogenation using the above catalyst was 0.184 mole per liter of solution per hour.

The reason for the beneficial effect of the present pretreatment upon the activity of the catalyst is not known. It is possible that one or more impurities normally present in activated aluminas are destroyed or removed from the surfaces of the alumina by the pretreatment, thereby permitting better dispersion of the metallic component on the alumina surfaces. It has been found that no comparable beneficial effect is obtained if the treatment with the oxidizing agent is carried out after impregnation with the metal compound and its reduction instead of prior thereto as required by the present method.

The choice of the oxidizing agent for pretreating the alumina will, in at least some instances, be governed by the use intended for the catalyst. Thus, if the catalyst is to be used in the hydrogenation stage of a cyclic process for producing hydrogen peroxide which involves alternately hydrogenating and oxygenating an intermediate such as an alkylanthraquinone, oxidizing agents which are compounds of heavy metals, such as manganese, vanadium and molybdenum, are preferably avoided. This is because the presence of even trace amounts of heavy metal compounds in systems containing peroxide is undesirable, as is well known. When the chosen oxidizing agent contains active halogen, it is preferred that the alumina, after treatment therewith, be washed with dilute aqueous hydrogen peroxide prior to the impregnation and reduction steps.

The beneficial effects of the oxidizing pretreatment of the alumina are realized to a worthwhile extent regardless of the methods employed for subsequently impregnating the alumina with a platinum metal compound and for reducing the latter. It is preferred, however, that impregnation be effected by addition of an aqueous solution of the platinum metal compound to a dilute water suspension of the alumina at 20 to 80° C. and at pH 5.5 to 7. By "dilute suspension" is meant one that contains at least 2.5 and preferably 3 to 10 parts of water per part by weight of alumina. Impregnating solutions containing a substantial amount up to 2 moles of HCl per mole of platinum metal compound are especially suitable. The amount of platinum metal compound in the impregnating solution will be determined by the amount of platinum metal desired in the final catalyst. The metal content of the catalyst will usually range from about 0.01 to 10%, the preferred range generally being 0.2 to 3%. The presence of soluble salts is preferably minimized. One way of doing this while also controlling pH is to wash the alumina from the oxidizing treatment once or twice with water saturated with carbon dioxide and to maintain carbon dioxide saturation during the impregnation. Advantageously, impregnation is effected at about room temperature in about 2 to 10 minutes and the slurry is then heated to about 75° C. in 10 to 30 minutes.

Reduction of the impregnated platinum metal compound can be effected using any of the common reducing agents such as formates, hydrazine or hydrogen. Preferably, reduction will be carried out using formaldehyde in small excess at 70 to 80° C. Under the preferred impregnating conditions, the pH of the slurry will be in the range 5.5 to 7 when the formaldehyde is added, which may be increased to a pH of about 8.0, e. g. by addition of sodium bicarbonate to accelerate reduction, following which the mixture is digested, for example, for 15 to 60 minutes at 70 to 80° C. The catalyst particles are then filtered, washed and dried.

I claim:

1. In a method for preparing a catalyst wherein activated alumina is impregnated with a compound of a metal of the platinum metal group, which compound is then reduced to said metal, the improvement comprising treating said activated alumina prior to said impregnation with an aqueous solution of an oxidizing agent at a temperature in the range from the freezing point to the boiling point of said solution, and then freeing said activated alumina of said oxidizing agent prior to said impregnation, said oxidizing agent being from the group consisting of the alkali metal and the alkaline earth metal hypochlorites and hypobromites.

2. The method of claim 1 wherein the solution of the oxidizing agent has a pH in the range 4 to 10.

3. The method of claim 1 wherein the solution of the oxidizing agent is employed at a temperature in the range 50° C. to the boiling point of the solution.

4. The method of claim 1 wherein the oxidizing agent is an alkali metal hypochlorite.

5. The method of preparing a catalyst comprising subjecting activated alumina to the action of an aqueous solution of an oxidizing agent at a pH in the range 4 to 10 and at a temperature in the range from the freezing point to the boiling point of said solution, freeing said alumina of said oxidizing agent, impregnating the so-treated alumina with an aqueous solution of a compound of a metal of the platinum metal group and then reducing the impregnated compound to said metal, said oxidizing agent being from the group consisting of the alkali metal and the alkaline earth metal hypochlorites and hypobromites.

6. The method of claim 5 wherein the treatment of the alumina with the solution of the oxidizing agent is effected at a temperature in the range from 50° C. to the boiling point of the solution of the oxidizing agent.

7. The method of claim 5 wherein the oxidizing agent is an alkali metal hypochlorite.

8. The method of claim 7 wherein the treatment of the alumina with the solution of the hypochlorite is effected at a pH in the range 6 to 9 and at a temperature in the range from 50° C. to the boiling point of the hypochlorite solution.

9. The method of claim 7 wherein the alumina is impregnated with a palladium compound.

10. The method of claim 7 wherein the impregnation of the alumina with the compound of a metal of the platinum metal group is effected at a pH in the range 5.5 to 7 and at a temperature of 20 to 80° C.

11. The method of claim 7 wherein the oxidizing agent is sodium hypochlorite.

12. The method of claim 9 wherein the impregnation of the alumina with a palladium compound is effected at a pH in the range 5.5 to 7 and at a temperature of 20 to 80° C.

13. The method of claim 11 wherein the treatment of the alumina with sodium hypochlorite is effected under a carbon dioxide atmosphere.

14. The method of claim 13 wherein the treatment of the alumina with sodium hypochlorite is effected at a temperature in the range from 50° C. to the boiling point of the sodium hypochlorite solution and the treated alumina is impregnated with a palladium compound.

References Cited in the file of this patent

UNITED STATES PATENTS

| | | |
|---|---|---|
| 1,312,853 | Kohler | Aug. 12, 1919 |
| 1,798,261 | Horsfield | Mar. 31, 1931 |
| 2,411,807 | Reismeyer | Nov. 26, 1946 |
| 2,457,566 | Krieger | Dec. 28, 1948 |
| 2,486,318 | Newsome et al. | Oct. 25, 1949 |
| 2,528,751 | Hunter | Nov. 7, 1950 |
| 2,551,944 | Haff | May 8, 1951 |
| 2,605,235 | Pitzer | July 29, 1952 |
| 2,611,736 | Haensel | Sept. 23, 1952 |
| 2,625,504 | Haensel et al. | Jan. 13, 1953 |
| 2,636,863 | Haensel | Apr. 28, 1953 |
| 2,636,865 | Kimberlin | Apr. 28, 1953 |
| 2,704,281 | Appell | Mar. 15, 1955 |